Oct. 11, 1927.

C. R. MOORE

ACOUSTIC DEVICE

Filed Dec. 8, 1922

Inventor:
Charles R. Moore.
by Att'y

Oct. 11, 1927.

C. R. MOORE 1,644,788

ACOUSTIC DEVICE

Filed Dec. 8, 1922 — 2 Sheets-Sheet 2

Inventor:
Charles R. Moore.
by
Att'y

Patented Oct. 11, 1927.

1,644,788

UNITED STATES PATENT OFFICE.

CHARLES R. MOORE, OF WYOMING, NEW JERSEY, ASSIGNOR TO WESTERN ELECTRIC COMPANY, INCORPORATED, OF NEW YORK, N. Y., A CORPORATION OF NEW YORK.

ACOUSTIC DEVICE.

Application filed December 8, 1922. Serial No. 605,554.

This invention relates to acoustic devices and its object is to produce a vibrating system for acoustic devices capable of accurately responding to, and reproducing without loss of quality or volume, vibrations of the frequency of ordinary sounds.

In general the invention comprises a small rigid diaphragm, aperiodic in character, with means which loosely support it and control its movements. More specifically the invention comprises the use of a small rigid diaphragm of light solid material and having a double convex surface mounted between cushions of paper or aluminum foil annuli which loosely support the diaphragm at its edges and produce a damping effect upon its movements.

Figure 1:
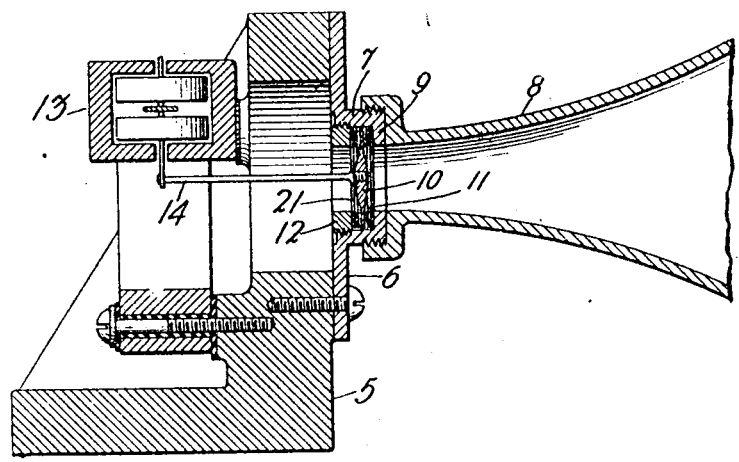
Fig. 1 is a cross section of a loud speaking receiver embodying the invention.
Figure 2:
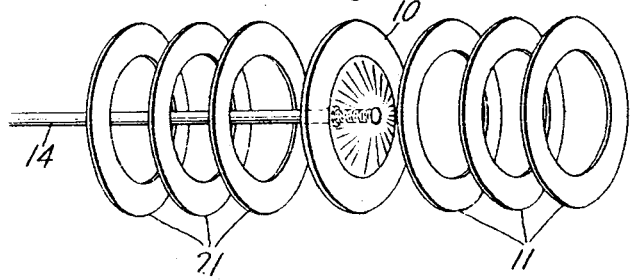
Fig. 2 is an exploded detail view of the diaphragm and its damping members.

Supported on a mounting 5 is a plate 6 provided with an outwardly projecting flange 7 which is both internally and externally threaded. The flange 7 has an opening communicating with a horn 8, and is provided with a seat 9. Closing the opening in the flange 7 is a rigid diaphragm, or plunger, 10. Interposed between the diaphragm 10 and the seat 9 is a cushion of annuli 11 of thin material, such as aluminum foil or paper, and disposed against the opposite side of diaphragm 10 is a cushion of similar annuli 21. A nut 12 engaging the plate 6 secured the diaphragm 10 and the washers 11 and 21 in position. The diaphragm 10 is preferably made of a very light material, such as aluminum or phenol plastic compound, and is so proportioned as to be substantially rigid and movable as a plunger in response to vibrations of ordinary sound frequency. In order to permit substantially free movement of the diaphragm 10, the space between the nut 12 and the seat 9 is somewhat greater than the total thickness of annuli 11 and 21, and the diaphragm 10 at its periphery. A space about 50% greater than the combined thickness of the annuli and the diaphragm has been found to give satisfactory results. This permits free movement of the diaphragm in response to the vibrations imparted to it by any suitable means such as the magnetic system 13 through rod 14 to the diaphragm. The magnetic system 13 may be of any suitable type such as that shown in Patent No. 1,365,898, of January 18, 1921, to H. G. Egerton. In addition to forming a flexible support for the rigid diaphragm 10, the annuli also provide an air damping means of the type described in my Patent 1,583,416, of May 4, 1926, for damping out the effects of resonance in any of the moving parts. Air damping is provided by the air films, which owing to the looseness of the annuli are formed between them. Movements of the diaphragm cause the inward and the outward flow of the air between these annuli.

Figure 3:
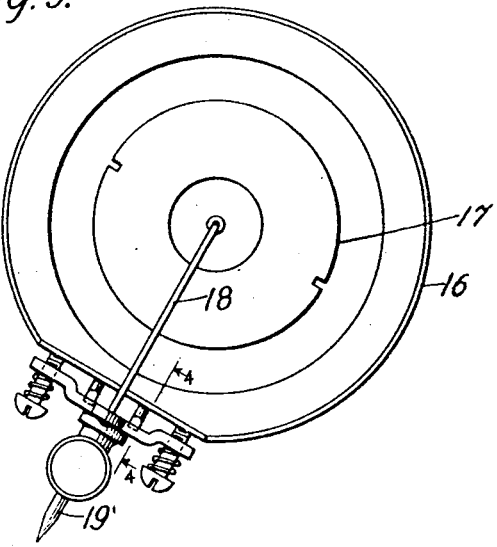
Figs. 3 and 4 show an application of the invention to a phonograph reproducer.
Figure 4:
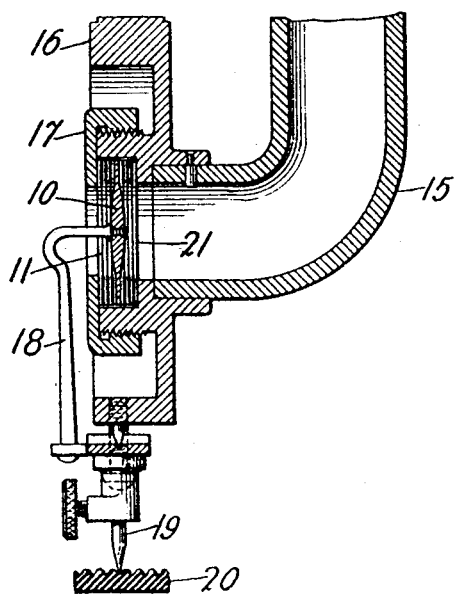

In Figs. 3 and 4, showing an application of the invention to phonograph reproducers, the plunger 10 is mounted in a chamber in the reproducer 16 communicating with the usual tone arm 15, and the perforated cap 17 serves to hold the annuli 11 and 21, and diaphragm 10 in place. Vibrations on the record 20 are transmitted to diaphragm 10 through the stylus 19 and stylus arm 18 in the usual manner. A rigid diaphragm air-damped at its periphery as described, faithfully reproduces recorded sounds and practically eliminates the scratching noises so noticeable with the usual type of reproducers.

The invention claimed is:

1. An acoustic device comprising a small rigid diaphragm positioned in a channel, and cushions of loosely held thin annuli positioned in said channel on both sides of said diaphragm for supporting said diaphragm at its edges and producing a damping effect upon its movement.

2. An acoustic device comprising a small rigid diaphragm positioned in a channel and cushions of loosely held thin annuli positioned in said channel on both sides of said diaphragm for supporting said diaphragm at its edges, said cushions comprising a plurality of sections which operate successively in series and all or part of which come into action depending upon the amplitude and the frequency of vibration of the diaphragm.

3. In an acoustic device comprising a small rigid diaphragm, means for positioning and damping said diaphragm consisting of a channel containing a plurality of thin annuli supporting the said diaphragm on both sides at its periphery, the said annuli applying an impedance to the diaphragm which changes with frequency.

4. In an acoustic device comprising a small rigid diaphragm, means for positioning and damping said diaphragm consisting of a channel containing a plurality of thin annuli supporting the said diaphragm on both sides at its periphery, the said annuli applying an impedance to the diaphragm which increases as the frequency increases and decreases as the frequency decreases.

5. In an acoustic system comprising a small rigid diaphragm, a supporting channel, and means for supporting said diaphragm and damping its movement consisting of thin annuli located on each side of said diaphragm, and mounted loosely in said supporting channel.

6. In an acoustic device comprising a small rigid diaphragm, supporting and damping means for said diaphragm for applying an impedance to the vibration of the diaphragm which changes with frequency, comprising a mounting channel, and a plurality of thin annuli located on each side of the diaphragm within said mounting channel, said annuli being held by the said mounting channel loosely but sufficiently close together to operatively prevent air leaking from one side of the diaphragm to the other.

7. A small aperiodic diaphragm vibratable as a whole, a mounting channel therefor, and a plurality of thin annuli loosely disposed on each side of said diaphragm near its periphery and mounted in said channel, the channel holding said annuli in axial alignment and with sufficient freedom of lateral movement that the air spaces between the said annuli are in the aggregate slightly greater than the maximum amplitude of vibration of the said diaphragm.

In witness whereof, I hereunto subscribe my name this 28th day of November A. D., 1922.

CHARLES R. MOORE.